United States Patent
Cochran

(10) Patent No.: US 7,223,375 B1
(45) Date of Patent: May 29, 2007

(54) EMISSION CONTROL SYSTEMS AND METHODS THEREOF

(75) Inventor: Joe W. Cochran, Palm Harbor, FL (US)

(73) Assignee: Progress Materials, Inc., St. Petersburg, FL (US)

( * ) Notice: Subject to any disclaimer, the term of this patent is extended or adjusted under 35 U.S.C. 154(b) by 0 days.

(21) Appl. No.: 11/474,794

(22) Filed: Jun. 26, 2006

(51) Int. Cl.
*B01D 53/34* (2006.01)
*B01D 53/50* (2006.01)
*B01D 53/60* (2006.01)

(52) U.S. Cl. .............. 423/210; 423/215.5; 423/239.1; 423/242.1; 423/243.06; 423/243.11; 423/243.12; 423/545; 423/549; 423/550

(58) Field of Classification Search .......... 423/210, 423/215.5, 239.1, 242.1, 243.06, 243.11, 423/243.12, 545, 549, 550
See application file for complete search history.

(56) References Cited

U.S. PATENT DOCUMENTS

| | | | |
|---|---|---|---|
| 4,003,986 A | 1/1977 | Lewis, Jr. | |
| 4,064,219 A | 12/1977 | Yamashita et al. | |
| 5,051,245 A | 9/1991 | Wilson et al. | |
| 5,160,539 A | 11/1992 | Cochran | |
| 5,399,194 A | 3/1995 | Cochran et al. | |
| 6,605,263 B2 | 8/2003 | Alix et al. | |
| 6,783,585 B2 | 8/2004 | Zacarias et al. | |
| 6,863,875 B1 | 3/2005 | Kotake et al. | |

*Primary Examiner*—Timothy C. Vanoy
(74) *Attorney, Agent, or Firm*—Nixon Peabody LLP

(57) ABSTRACT

A method and system for controlling one or more emissions includes introducing ammonia to react with at least a portion of sulfur trioxides in an exhaust emission and result in at least one or more ammoniated compounds. At least a portion of fly ash particles and the ammoniated compounds in the exhaust emission are precipitated. At least a portion of the ammonia from the precipitated ammoniated compounds is recovered with heat from the exhaust emission and the recovered ammonia is reused.

9 Claims, 1 Drawing Sheet

EMISSION CONTROL SYSTEMS AND METHODS THEREOF

FIELD OF THE INVENTION

This invention generally relates to systems and methods for emissions control and, more particularly, to nitrogen oxide and sulfur trioxide emission control systems and methods thereof.

BACKGROUND

Exhaust emission from coal fired furnaces or boilers such as those used in power plants, may contain a variety of different gases depending on the type of coal being burned. The amounts at which some of these gases could be emitted into the environment are regulated. For example, there are restrictions on the amount of nitrogen oxides which could be emitted into the atmosphere.

To reduce the amount of nitrogen oxides emitted into the environment, selective catalytic reactors have been added into the exhaust systems of coal fired furnaces and boilers such as at power plants. Ammonia is injected into a selective catalytic reactor (SCR) and mixes with the nitrogen oxides in the exhaust emission to produce pure nitrogen and water, thus reducing the amount of emitted nitrogen oxides.

Unfortunately, this retrofit of selective catalytic reactors to coal fired furnaces and boilers such as in power plants to reduce nitrogen oxides can also result in visible emissions known as "blue plume." This begins with the oxidation of a relatively small portion of the sulfur dioxides in the exhaust emissions to sulfur trioxide. Sulfur trioxide and water vapor readily combine to form an acid mist. Small amounts of water vapor, which may or may not be sufficient to convert enough sulfur trioxide to acid mist to become visible, are available in the exhaust gases both from humidity in the combustion air and products of combustion of the small amount of hydrogen in the coal. If there is insufficient water in the exhaust gases, blue plume may form downstream of the plant stack after the sulfur trioxide combines with atmospheric moisture. Finally, if the plant has a wet SO2 scrubber, there is abundant moisture present to convert a high fraction of the sulfur trioxide to acid mist and a substantial portion of this mist escapes the scrubber. The source of moisture merely controls where the acid mist is formed and, thereby, how visible it will be.

In any case, sulfuric acid mist is formed which can come down to the surface of the earth as acid rain. The long term health effects of sulfur trioxide or blue plume are not well known. The amount of sulfur dioxide catalyzed to sulfur trioxide and thence to acid mist is a relatively small fraction of the total sulfur from the coal burned. Nevertheless, the problem of blue plume is of great concern as evidenced by the purchase of most of the town of Chesire, Ohio by American Electric Power Co. (AEP) because of blue plume emitted from AEP's power plant which was upwind of the town of Chesire.

Several methods for essentially eliminating the acid mist and associated blue plume resulting from sulfur trioxide have been proposed. At least one has been reported successful. This method involves injecting ammonia (at much higher dosages than are used in the SCR) to the exhaust gas at a point where its temperature has been reduced to the range of about 250–300° F. (although the injection is sometimes carried out at higher temperatures). At this temperature, the ammonia reacts readily with the sulfur trioxide to form a number of possible compounds, the most notable of which are ammonium sulfate and ammonium bisulfate. The formation of these compounds by this reaction can capture a very high fraction of the sulfur trioxide thereby eliminating the conversion to acid mist and formation of blue plume.

This method of controlling blue plume, while highly effective, has several disadvantages. First, the large usage of ammonia constitutes a substantial expense. Second, if insufficient ammonia is injected, the reaction produces mostly ammonium bisulfate which is a very sticky, somewhat liquid substance at these temperatures. Ammonium bisulfate can quickly build up on downstream equipment and cause operational problems. Finally, even when sufficient ammonia is used to assure predominately ammonium sulfate (a dry powder) is formed, the ammoniated compounds are collected with and detrimental to the quality of the fly ash. The most advantageous use for fly ash (highest value and largest quantity) is in concrete as a partial replacement for Portland cement. Even the smaller quantities of ammoniated compounds that sometimes results from SCR use are problematic for this use of fly ash. The much larger amounts of these compounds from blue plume control by ammonia injection make the ash completely unusable. Unusable ash is typically disposed of in landfills. However, since many of the ammoniated compounds (such as ammonium sulfate) are water soluble, it is not clear that landfill disposal will be acceptable for ash containing large quantities of these compounds.

SUMMARY

A method for controlling one or more emissions in accordance with embodiments of the present invention includes introducing ammonia to react with at least a portion of sulfur trioxides in an exhaust emission and results in at least one or more ammoniated compounds. At least a portion of fly ash particles and the ammoniated compounds in the exhaust emission are precipitated. At least a portion of the ammonia from the precipitated ammoniated compounds is recovered with heat from the exhaust emission and the recovered ammonia is reused.

A system for controlling one or more emissions in accordance with other embodiments of the present invention includes a first ammonia delivery system, the precipitator system, the recovery system, and the resupply system. The first ammonia delivery system is connected to an exhaust system to introduce ammonia that reacts with at least a portion of sulfur trioxides in an exhaust emission and results in at least one or more ammoniated compounds. The precipitator system precipitates at a least a portion of fly ash particles and the ammoniated compounds in the exhaust emission. The recovery system recovers at least a portion of the ammonia from the precipitated ammoniated compounds with heat from the exhaust emission. The resupply system supplies the recovered ammonia to the first ammonia delivery system.

A method for making a system for controlling one or more emissions in accordance with other embodiments of the present invention includes connecting a first ammonia delivery system to an exhaust system to introduce ammonia that reacts with at least a portion of sulfur trioxides in an exhaust emission and results in at least one or more ammoniated compounds. A precipitator system is connected to the exhaust system to precipitate at a least a portion of fly ash particles and the ammoniated compounds in the exhaust emission. A recovery system is connected to the precipitator system and the exhaust system that recovers at least a portion of the ammonia from the precipitated ammoniated compounds with heat from the exhaust emission. A resupply system is connected to the first ammonia delivery system that supplies the recovered ammonia.

The present invention provides a number of advantages including providing an effective system and method for controlling and reducing nitrogen oxides and sulfur trioxides in exhaust emission while recovering ammonia used to control these emissions. Additionally, the fly ash particles, from which the ammonia is recovered, could be used for other applications, such as a substitute for a portion of the cement in concrete.

The present invention provides a system in which NH3 injection could be used for its very effective control of nitrogen oxides and also control of blue plume (along with partial capture of sulfur compounds from the exhaust gases). Additionally, the present invention is able to achieve this control by utilizing the high concentrations of ammonia necessary to avoid creating problems in downstream power plant equipment, but without the large increase in ammonia cost and without contaminating the resulting fly ash such that it cannot be beneficially used. Further, the present invention accomplishes this without creating substantial new emissions, such as the conversion of ammoniated compounds into oxides of nitrogen.

DETAILED DESCRIPTION

Figure 1:
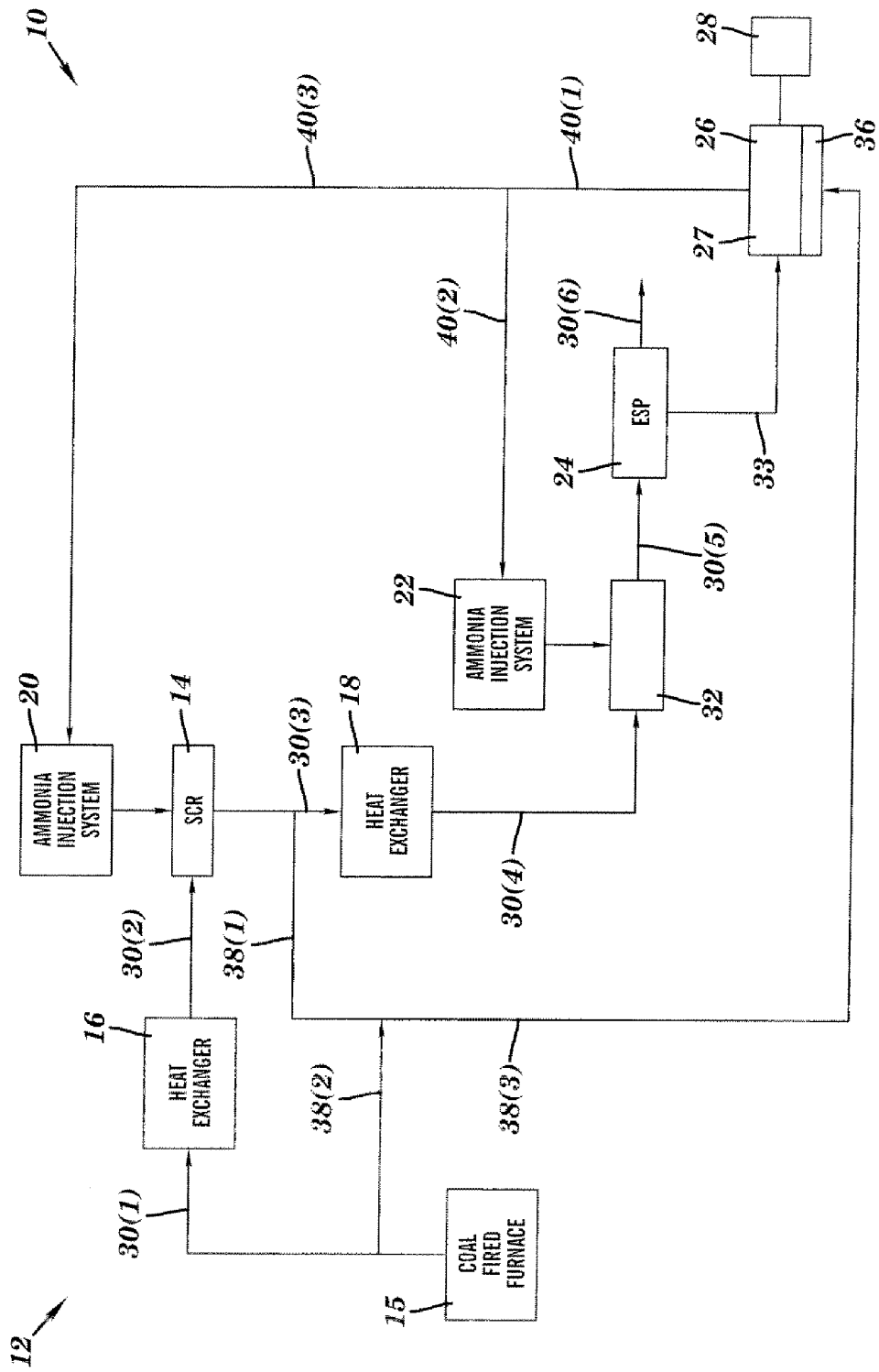
FIG. 1 is a block diagram of an emission control system in accordance other embodiments of the present invention.

An emission control system 10 in accordance with embodiments of the present invention is illustrated in FIG. 1. The emission control system 10 includes an exhaust system 12, a selective catalytic reactor 14 (SCR), heat exchangers 16 and 18, ammonia injection systems 20 and 22, an electrostatic precipitator 24 (ESP), an ammonia recovery system 26, and a collection bin 28, although the sulfur emission control system 10 can comprise other numbers and types of components in other configurations. The present invention provides an effective system and method for controlling and reducing nitrogen oxides and sulfur trioxides and for recapturing and reusing at least a portion of the injected ammonia used in reducing these emissions.

Referring more specifically to FIG. 1, the exhaust system 12 comprises a number of lines, ducts or pipes 30(1)–30(6) and a chamber 32 which are used to transport and process the exhaust emission, although the exhaust system 12 can comprise other types and numbers of vessels for carrying and processing the exhaust emissions in other configurations. The line 30(1) of the exhaust system 12 is connected to the exhaust emission outlet of a coal power plant furnace 15, although the exhaust system 12 could be connected to other sources of exhaust emission, such as to a coal fired industrial furnace. The exhaust emission from the coal power plant 15 or other exhaust emission source which is input to the line 30(1) of the exhaust system 12 includes fly ash particles and one or more other gases, such as sulfur dioxides and nitrogen oxides, although the exhaust emission could include other elements.

The heat exchanger 16 (called an economizer in a coal fired power plant or similar boiler) is connected between the line 30(1) from the coal power plant furnace 15 and the line 30(2) to the selective catalytic reactor 14, although the heat exchanger 16 could be connected to other components and in other configurations. The heat exchanger 16 reduces the temperature of the exhaust emission to between about 600 degrees to 750 degrees Fahrenheit which is a more optimal temperature for the removal of at least a portion of the nitrogen oxides in the selective catalytic reactor 14, although the temperature of the exhaust emission could be reduced to other temperatures.

The selective catalytic reactor 14 is connected between the line 30(2) from the heat exchanger 16 and the line 30(3) to the heat exchanger 18 (called an air preheater in a coal fired power plant or similar boiler), although the selective catalytic reactor 14 could be connected to other components and in other configurations. An ammonia injection system 20 is connected to and injects the ammonia ($NH_3$) into the selective catalytic reactor 14 which is used to react with and reduce the amount of nitrogen oxides in the exhaust emission. More specifically, the selective catalytic reactor 14 uses ammonia ($NH_3$) to reduce nitrogen oxides ($NO_X$) in the exhaust emission to nitrogen (N) and water ($H_2O$) in a chemical reduction. By way of example, this reaction can be illustrated by the following generalized formula:

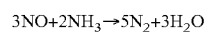

$$3NO+2NH_3 \rightarrow 5N_2+3H_2O$$

The catalytic action of the selective catalytic reactor 14 also causes a portion of the sulfur dioxide ($SO_2$) in the exhaust emission to react with oxygen to generate sulfur trioxide ($SO_3$) as illustrated in the following generalized formula:

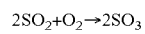

$$2SO_2+O_2 \rightarrow 2SO_3$$

The sulfur trioxide in the exhaust emission further reacts with moisture either in the exhaust or after release to the atmosphere to form acid mist (primarily tiny $H_2SO_4$ droplets) by the following generalized formula:

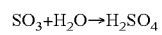

$$SO_3+H_2O \rightarrow H_2SO_4$$

This acid mist results in blue plume when released into the environment.

Heat exchanger 18, which, as noted above, is called an air preheater in a coal fired power plant or similar boiler, is connected in the exhaust system 12 between the line 30(3) from the selective catalytic reactor 14 and the line 30(4) in the chamber 32, although the heat exchanger 18 could be connected to other components and in other configurations. The heat exchanger 18 reduces the temperature of the exhaust emission to between about 275 degrees to 300 degrees Fahrenheit which is a more optimal temperature for the removal of at least a portion of the sulfur trioxides in the exhaust emission, although the temperature of the exhaust emission could be reduced to other temperatures.

The chamber 32 is connected in the exhaust system 12 between the line 30(4) from the heat exchanger 18 and the line 30(5) to the electrostatic precipitator 24, although the chamber 32 could be connected to other components in other configurations. The ammonia injection system 22 is connected to and used to inject the ammonia into the chamber 32, although other manners for supplying ammonia could be used. At least a portion of the sulfur trioxides react with the ammonia in the chamber 32 to form primarily ammonium sulfate and ammonium bisulfate, although other ammoniated compounds may be formed in smaller quantities and the mixing and reacting can take place in other types of vessels and in other locations. Generally, ammonium bisulfate particles, which are sticky, adhere to the fly ash particles while ammonium sulfate particles, which are dry solids, may be separate from, but mixed with, the fly ash particles.

The electrostatic precipitator 24 is connected between the line 30(5) from the chamber 32 and the line 30(6) which outputs the exhaust emissions to the environment or other location such as the inlet of a wet scrubber for SO2 removal.

The electrostatic precipitator 24 also is connected to supply precipitated fly ash particles (with the included ammoniated compounds) by a pipe 33 to the ammonia recovery system 26, although the electrostatic precipitator 24 could be connected to other components and in other configurations. The electrostatic precipitator 24 is used to precipitate at least a portion of the fly ash particles and the ammoniated compounds from the exhaust emission, although other manners for separating the fly ash particles from the exhaust emission, such as baghouses, cyclones and wet electrostatic precipitators could be used.

The ammonia recovery system 26 includes a chamber 27 with gas mixing system 36, although the ammonia recovery system 26 can comprise other types and numbers of components. The chamber 27 with the gas mixing system 36 is connected to receive the precipitated fly ash particles via the pipe 33 from the electrostatic precipitator 24, although the ammonia recovery system 26 could be connected to other components and in other configurations including, for example, intermediate fly ash storage and transport systems. Additionally, the gas mixing system 36 for the ammonia recovery system 26 is connected to receive hot gas from either just upstream of heat exchanger 18 via lines 38(1) and 38(3) or, optionally, from just upstream of heat exchanger 16 via lines 38(2) and 38(3).

The ammonia recovery system 26 also has outputs connected to a collection bin 28 in which the processed fly ash particles are collected and to pipes 40(1)–40(3) which return recovered ammonia along with the now cooler gas and small quantities of the fly ash back to the ammonia injection systems 20 and 22, although the outputs from the ammonia recovery system 26 could be connected to other components and in other configurations. For example, the stream in pipes 40(1)–40(3) could be routed through a cyclone or similar dust collection system to return the small amounts of fly ash to collection bin 28 and avoid recirculating it through the ammonia injection systems 20 and 22.

The ammonia recovery system 26 is used to recover at least a portion of the ammonia injected into the exhaust emission by the ammonia injection systems 20 and 22 during the reduction of nitrogen oxides and sulfur trioxides. The ammonia injection systems 20 and 22 provide for injection of the recovered ammonia in a gaseous stream in addition to injection of liquid or vaporized fresh ammonia through typical SCR nozzles, although the ammonia injection systems 20 and 22 could introduce ammonia in one or more other manners.

The operation of the emission control system 10 will now be described with reference to FIG. 1. Pulverized coal particles are combusted in the coal fired furnace 15 and the exhaust emission from this combustion is output into the line 30(1) of the exhaust system 12, although the exhaust emission could be provided by other sources and could be output in other manners. The exhaust emission includes fly ash particles and one or more other gases, such as sulfur dioxides and nitrogen oxides, although the exhaust emission could include other elements.

Next, the exhaust emission, which is above about 750 degrees, is input to the heat exchanger 16 via line 30(1) where the temperature of the exhaust emission is reduced to between about 600 degrees to 750 degrees Fahrenheit to be at a more optimal temperature for the removal of at least a portion of the nitrogen oxides in the selective catalytic reactor 14, although the temperature of the exhaust emission could be reduced to other temperatures.

Once the temperature of the exhaust emission is reduced to between about 600 degrees to 750 degrees Fahrenheit, the exhaust emission is provided via line 30(2) to the selective catalytic reactor 14. Additionally, ammonia ($NH_3$) is supplied from the ammonia injection system 20 to the selective catalytic reactor 14, although other manners for reducing the nitrogen oxides could be used. The ammonia ($NH_3$) in the selective catalytic reactor 14 converts at least a portion of the nitrogen oxides to nitrogen (N) and water ($H_2O$) in a chemical reduction in the selective catalytic converter 14. With the present invention, the partial recovery and reuse of ammonia enables the ammonia injection system 20 to more economically reduce more of the nitrogen oxides than was previously possible.

During the reduction process described above, sulfur dioxide and oxygen, which are also present in the exhaust emission, react in the presence of the catalyst in the selective catalytic reactor 14 to generate sulfur trioxide ($SO_3$). The amount of sulfur dioxide in the exhaust emission depends on the amount of sulfur in the coal which was combusted and produced the exhaust emission.

Next, the temperature of the exhaust emission leaving the selective catalytic reactor 14 is further reduced to a temperature between about 275 degrees to 300 degrees Fahrenheit to be at a more optimal temperature for the removal of at least a portion of the sulfur trioxides in the exhaust emission, although the temperature of the exhaust emission could be adjusted to other temperatures.

Once the temperature of the exhaust emission from the selective catalytic reactor 14 is reduced to a temperature between about 275 degrees to 300 degrees Fahrenheit, the exhaust emission is provided via line 30(4) to the chamber 32. Additionally, ammonia is provided to the chamber 32 from the ammonia injection system 22, although other manners and configurations could be used. The ammonia supplied by the ammonia injection system 22 reacts with at least a portion of the sulfur trioxides which causes the reacted sulfur trioxides to form ammoniated compounds that adhere and/or are mixed in with the fly ash particles. The ammonia is introduced by the ammonia injection system 22 at a rate and amount which results in a majority of these ammoniated compounds comprising ammonium sulfate particles, although the ammonia can be introduced at other rates and amounts. Additionally, the amount of ammonia supplied by the ammonia injection system 22 to the exhaust emission in the chamber 32 is greater than the amount of ammonia supplied by the ammonia injection system 20 to the exhaust emission in the selective catalytic reactor 14. This greater amount of ammonia is needed to obtain the desired conversion of the sulfur trioxides to dry, solid ammoniated compounds in the exhaust emission. In this particular embodiment, the amount of ammonia supplied by ammonia injection system 22 is about ten times the amount supplied by the ammonia injection system 20 to obtain the desired conversion of at least a portion of the sulfur trioxides, although other ratios of supplied ammonia by the respective ammonia injection systems 20 and 22 could be used.

Next, the fly ash particles with the included ammoniated compounds are supplied via line 30(5) to the electrostatic precipitator 24 where they are at least partially precipitated out of the exhaust emission, although other manners for separating the fly ash particles and ammoniated compounds from the exhaust emission could be used. The precipitated fly ash particles are supplied via a pipe 33 to the chamber 27 of the ammonia recovery system 26, although the precipitated fly ash particles could be supplied to other locations and in other manners.

Hot exhaust emission gas taken from either line 30(3) after the selective catalytic reactor 14 or line 30(1) before the heat exchanger 16 is routed to the gas mixing system 36 via either lines 38(1) and 38(3) or 38(2) and 38(3). The gas mixing system 36 evenly distributes the hot gas into the mass of fly ash in chamber 27 thereby heating the fly ash to a selected temperature. After a selected residence time at this temperature, at least a portion of the ammoniated compounds decompose into ammonia and other gases such as $SO_2$. The recovered ammonia along with the now cooler exhaust gas and any other gaseous by-products is output to the pipe 40(1) which is connected to pipe 40(2) and to pipe 40(3), although the ammonia could be output in other manners and configurations, such as to a storage container. In this particular embodiment, the pipe 40(2) supplies a portion of the recovered ammonia stream to the ammonia injection system 22 and the pipe 40(3) supplies a portion of the recovered ammonia stream to the ammonia injection system 20.

The choice of whether to use hot exhaust emission gas taken from line 30(3) or 30(1), or a blend of both, and the specific design of the gas mixing system 36, will be made to optimize the site specific economics. For example, characteristic equations relating the temperature and residence time in chamber 27 with the fraction of ammoniated compounds decomposed (and therefore, the fraction of ammonia recovered and the remaining concentration on the fly ash by-product) may be developed by laboratory testing of any given stream of fly ash with included ammoniated compounds. The desired level of ammonia recovery will determine the required fly ash temperature/residence time relationship. Fly ash residence time for a given throughput is directly related to the plan area and depth of chamber 27. Generally, a lower selected temperature will require a longer residence time and, therefore, a larger chamber 27. If site specific economics indicate that it is desirable to limit the plan area of chamber 27, then the height must increase. Similarly, the temperature of the hot exhaust emission gas will determine how much of the gas must be mixed with the fly ash to achieve the selected fly ash temperature. The selected plan area of chamber 27 will determine the velocity of the hot exhaust emission gas through the fly ash. If this velocity is low, the fly ash may be considered a "fixed bed". At higher velocities the fly ash will become "aerated" and at still higher velocities "fluidized" (at even higher velocities, the fly ash would be simply pneumatically transported out of chamber 27, but this is not a useful state). Either fixed bed, aerated or fluidized designs are workable, but require different types of equipment for the gas mixing system 36. As is apparent, these relationships are relatively simple and optimization of the design specifics may be accomplished by one of ordinary skill.

Once at least a portion of the ammonia is recovered, the mixed and heated fly ash particles are output from the chamber 27 to the collection bin 28. Prior to the ammonia recovery system 26, with the ammoniated compounds resulting from the additional ammonia injected to reduce the amount of sulfur trioxide, the fly ash particles have an ammonia content which may make them unsuitable for use in other applications. With the ammonia recovery system 26, at least a portion of the ammonia is recovered and removed from the fly ash particles so that the fly ash particles can still be used for other applications, such as a substitute for a portion of the cement in concrete.

Accordingly, the present invention provides an effective system and method for controlling and reducing sulfur trioxides in exhaust emission using ammonia at injection rates that prevent formation of undesirable sticky ammoniated compounds that could damage downstream equipment. Additionally, the present invention is able to recapture and reuse at least a portion of the injected ammonia used in reducing the sulfur trioxide in exhaust emission. Further, with the additional processing to remove the ammonia the fly ash particles are in a suitable condition for use in other applications, such as for replacement of a portion of the Portland cement in concrete.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for controlling one or more emissions, the method comprising:
    introducing ammonia to react with at least a portion of sulfur trioxides in an exhaust emission and result in at least one or more ammoniated compounds;
    precipitating at a least a portion of fly ash particles and the ammoniated compounds in the exhaust emission;
    recovering at least a portion of ammonia from the precipitated ammoniated compounds with heat from the exhaust emission; and
    reusing the recovered ammonia in the introducing the ammonia.

2. The method as set forth in claim 1 further comprising combusting coal which creates the exhaust emission.

3. The method as set forth in claim 1 wherein the introducing ammonia is at a rate wherein at least a majority of the resulting ammoniated compounds comprise ammonium sulfate.

4. The method as set forth in claim 1 further comprising:
    introducing initial ammonia to react with at least a portion of nitrogen oxides and sulfur dioxides in the exhaust emission and result in at least sulfur trioxides before the introducing ammonia to react with at least the portion of sulfur trioxides;
    wherein the recovering recovers at least a portion of the initial ammonia from the precipitated ammoniated compounds with heat from the exhaust emission;
    wherein the reusing reuses the recovered ammonia and the recovered initial ammonia in at least one of the introducing the initial ammonia and the introducing the ammonia.

5. The method as set forth in claim 4 wherein at least one of the initial ammonia and the ammonia are introduced in a gaseous form and at least a partially liquid form.

6. The method as set forth in claim 4 further comprising reclaiming the heat from the exhaust emission from at least one of before the introducing the initial ammonia and from between introducing the ammonia and the introducing the additional ammonia.

7. The method as set forth in claim 6 wherein the reclaiming the heat from the exhaust emission from before the introducing the initial ammonia further comprises reclaiming the heat from the exhaust emission before a first reduction of temperature of the exhaust emission with a heat exchanger.

8. The method as set forth in claim 6 wherein the reclaiming the heat from the exhaust emission is from before the introducing the initial ammonia and between introducing the initial ammonia and the introducing the ammonia.

9. The method as set forth in claim 1 further comprising collecting the precipitated fly ash particles after the recovering.

* * * * *